United States Patent
Diehm et al.

(10) Patent No.: US 10,385,770 B2
(45) Date of Patent: Aug. 20, 2019

(54) CHECK VALVE FOR CONNECTING ROD OF VARIABLE COMPRESSION INTERNAL COMBUSTION ENGINE AND CONNECTING ROD WITH THE CHECK VALVE

(71) Applicant: ECO Holding 1 GmbH, Marktheidenfeld (DE)

(72) Inventors: Alexander Diehm, Wertheim-Dertingen (DE); Bastian Eckrich, Marktheidenfeld (DE); Dietmar Schulze, Muenzenberg (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 15/873,194

(22) Filed: Jan. 17, 2018

(65) Prior Publication Data

US 2018/0230900 A1 Aug. 16, 2018

(30) Foreign Application Priority Data

Feb. 13, 2017 (DE) .......................... 10 2017 102 791
Sep. 15, 2017 (DE) .......................... 10 2017 121 443

(51) Int. Cl.
*F02D 15/02* (2006.01)
*F02B 75/04* (2006.01)
(Continued)

(52) U.S. Cl.
CPC .......... *F02B 75/045* (2013.01); *F01B 31/14* (2013.01); *F16K 15/028* (2013.01); *F16K 15/04* (2013.01);
(Continued)

(58) Field of Classification Search
CPC ...... F02B 75/045; F01B 31/14; F16K 15/028; F16C 7/06; F16C 23/10; F02D 15/02
(Continued)

(56) References Cited

U.S. PATENT DOCUMENTS

2013/0333770 A1* 12/2013 Maita .................... F02M 59/48
137/315.41
2015/0233288 A1* 8/2015 Paul ...................... F02B 75/045
123/48 B (Continued)

FOREIGN PATENT DOCUMENTS

DE 102012112481 6/2014
DE 102013107127 1/2015
(Continued)

*Primary Examiner* — Lindsay M Low
*Assistant Examiner* — Teuta B Holbrook
(74) *Attorney, Agent, or Firm* — Von Rohrscheldt Patents

(57) ABSTRACT

A check valve for a connecting rod for a variable compression internal combustion engine with at least one hydraulic chamber arranged in the connecting rod and connectable with a supply connection or a tank through the check valve, the check valve including a valve housing; and a valve closure element that is axially movable in the valve housing along a longitudinal valve axis, wherein the valve closure element is applicable to a valve seat and arranged in the valve housing secured against separation from the valve housing, wherein a pin shaped separation prevention element is provided which secures the valve closure element in the valve housing and limits a stroke of the valve closure element.

12 Claims, 2 Drawing Sheets

(51) Int. Cl.
  *F16K 15/02* (2006.01)
  *F01B 31/14* (2006.01)
  *F16K 15/04* (2006.01)
  *F16C 7/06* (2006.01)
  *F16C 23/10* (2006.01)

(52) U.S. Cl.
  CPC .............. *F02D 15/02* (2013.01); *F16C 7/06* (2013.01); *F16C 23/10* (2013.01); *F16C 2360/22* (2013.01)

(58) Field of Classification Search
  USPC .............................................. 123/48 B, 78 E
  See application file for complete search history.

(56) References Cited

U.S. PATENT DOCUMENTS

| | | | |
|---|---|---|---|
| 2015/0260094 A1* | 9/2015 | Wittek ................. | F02B 75/045 123/48 B |
| 2016/0177997 A1* | 6/2016 | Ezaki ..................... | F16C 7/06 123/48 B |
| 2016/0319737 A1* | 11/2016 | Schaffrath ............. | F02B 75/045 |
| 2016/0341118 A1* | 11/2016 | Kamo ................... | F02B 75/045 |
| 2017/0145913 A1* | 5/2017 | Diehm .................. | F16K 15/025 |
| 2017/0248074 A1* | 8/2017 | Ezaki ..................... | F02D 15/02 |
| 2017/0268421 A1* | 9/2017 | Mudra .................. | F02B 75/045 |
| 2017/0284455 A1* | 10/2017 | Kim ...................... | F02B 75/045 |

FOREIGN PATENT DOCUMENTS

| | | |
|---|---|---|
| DE | 102015001066 B3 | 10/2015 |
| DE | 102015103205 A1 | 9/2016 |
| WO | WO2007085739 A2 | 8/2007 |
| WO | WO2016102019 A1 | 6/2016 |

\* cited by examiner (A-A)

(C-C)

CHECK VALVE FOR CONNECTING ROD OF VARIABLE COMPRESSION INTERNAL COMBUSTION ENGINE AND CONNECTING ROD WITH THE CHECK VALVE

RELATED APPLICATIONS

This application claims priority from and incorporates by reference German patent applications DE 10 2017 102 791.2 filed on Feb. 13, 2017 and DE 10 2017 121 443.7 filed on Sep. 15, 2017.

FIELD OF THE INVENTION

The invention relates to a check valve for a connecting rod for a variable compression internal combustion engine and a connecting rod with the check valve

BACKGROUND OF THE INVENTION

In internal combustion engines a high compression ratio has a positive effect upon efficiency of the internal combustion engine. Compression ratio is typically designated as a ratio of an entire cylinder volume before compression divided by a remaining cylinder volume after the compression. In internal combustion engines with external ignition in particular gasoline engines which have a fixed compression ratio, the compression ratio, however, must only be selected up to a level where a so called knocking of the internal combustion engine under full load operations is avoided. However, the compression ratio can be selected with higher values for the much more prevalent partial load operation of the internal combustion engine, thus with a low cylinder charge, without the knocking occurring. The important partial load operations of an internal combustion engine can be improved when the compression ratio is variably adjustable. In order to adjust the compression ratio systems with variable connecting rod length are known which actuate an eccentrical element adjustment arrangement of a connecting rod using hydraulic switch valves.

A connecting rod of this type is known for example from DE 10 2013 107 127 A1 and includes an eccentrical element adjustment arrangement for adjusting an effective connecting rod length, wherein the eccentrical element adjustment arrangement includes an eccentrical element that cooperates with an eccentrical element lever and two pistons that are respectively displaceably arranged in a respective hydraulic chamber and wherein eccentrical element rods engaging the eccentrical element lever are supported at the two pistons. An adjustment travel of the eccentrical element adjustment arrangement is adjustable by a switch valve. Adjusting the adjustment travel adjusts an effective connecting rod length. This controls the compression of the internal combustion engine. Check valves in the connecting rod respectively prevent any flow back of hydraulic fluid from the hydraulic chambers to a supply connection or a tank.

DE 10 2012 112 481 A1 discloses a hydraulic valve suitable for this purpose.

BRIEF SUMMARY OF THE INVENTION

Thus, it is an object of the invention to provide an improved check valve that is robust and producible in a cost effective manner and an improved connecting rod with the check valve.

The object is achieved by the features of the independent claims.

Advantageous embodiments and advantages of the invention can be derived from the dependent claims, the description and the drawing figure.

A check valve is proposed for a connecting rod of a variable compression internal combustion engine including at least one hydraulic chamber in the connecting rod, wherein the hydraulic chamber is connectable by the check valve with a supply connection or with a tank. The check valve includes a valve housing and a valve closure element that is axially displaceable in the valve housing along a longitudinal valve axis, wherein the valve closure element is applicable to a valve seat and attached at the valve housing.

According to the invention a pin shaped attachment element is provided which secures the valve closure element in the valve housing and which limits a stroke of the valve closure element.

Using a pin shaped attachment element facilitates a particularly cost effective configuration of the check valve and furthermore has the advantage that the flow though of the hydraulic fluid is restricted as little as possible when the hydraulic valve is open so that a flow through resistance of the valve is reduced. This achieves a significant advantage over the typical securing method for valve closure elements like e.g. balls which are typically secured by closure covers. The function of the closure cover can be advantageously achieved by the attachment element which reduces module cost.

Using the attachment pin as a separation prevention element reduces assembly complexity for the check valve since the individual components of the check valve are configured simpler. Furthermore simplified contours at the valve housing provide a cost reduction over a conventional valve housing of a check valve.

According to an advantageous embodiment the separation prevention element can be arranged transversal to a movement direction of the valve closure element. In particular a pin shaped separation prevention element can prevent a separation of the valve closure element in this arrangement in that the separation prevention element limits a stroke of the valve closure element and limits a flow through of the hydraulic fluid though the open check valve as little as possible. The separation prevention element can thus be reliably mounted in the valve housing.

According to an advantageous embodiment the separation prevention element can be arranged so that it penetrates the valve housing orthogonal or substantially orthogonal to the valve longitudinal axis. The pin shaped element secures the valve closure element in the valve housing, thus simultaneously facilitates a liquid flow through the valve body. Thus, additional liquid pass through openings in the separation prevention element are not provided. The pin shaped separation prevention element can thus be advantageously arranged in the valve housing in a radial bore hole that extends transversally through the valve housing.

According to a particularly advantageous embodiment of the invention the separation prevention element can be configured as a standard cylindrical pin which can be arranged in the valve housing in a form locking manner. The cylindrical pin is particularly economical component. The cylindrical pin can be configured e.g. according to the standard DIN 6325 or according to the standard DIN EN ISO 8734 of March 1998. According to this standard DIN EN ISO 8734 hardened steel cylindrical pins are available for example in a tolerance class m6. The pin shaped loss prevention element is thus not limited to a cylindrical shape. By the same token standard components with different shapes can be used within the scope of the invention.

Mounting the standard components can be done in a particularly cost effective manner since tools for machining the valve housing like e.g. fabricating bore holes for standard components and for mounting the standard components are quite economical. Thus, the entire check valve can be produced in a cost effective manner. Furthermore quality of the purchased standard components can be monitored easily and maintained reliably. Thus, cost of the entire module can be advantageously reduced.

According to an advantageous embodiment the separation prevention element can be arranged in a form locking manner in the valve housing. The valve housing can include e.g. a radial bore hole transversally arranged through the valve housing and thus transversal to the movement direction of the valve closure element so that a cylindrical pin can be pressed into the valve housing in a form locking manner after mounting the valve closure element in the valve housing.

According to an advantageous embodiment the separation prevention element can also be alternatively or additionally bonded into the valve housing. The separation prevention element can for example be glued or welded into the valve housing. It is also conceivable after pressing the separation prevention element into the valve housing, thus form locking arrangement in the valve housing, to additionally glue or weld the separation prevention element with a spot weld to the valve housing to prevent disengagement from the valve housing.

According to an advantageous embodiment the valve closure element can be configured as a ball. Also a ball can be a standard component so that the check valve can be produced in an even simpler and more cost effective manner. Standard balls are available for many applications in many sizes and are produced either according to DIN 5401-1 (November 1993) or from special materials according to DIN 5401-2 (November 1993).

According to an advantageous embodiment the valve seat can be configured spherical at least in portions. This provides a particularly secure valve seat when a ball is used as a valve closure element. Thus, a particularly tight closure function of the check valve can be achieved in closed condition of the check valve. Thus, also the risk that the valve closure element seizes in the valve housing is significantly reduced.

According to an advantageous embodiment the valve housing can be a longitudinal bore hole with shoulders that includes a first section with a first interior diameter and a second section with a second interior diameter, wherein the first interior diameter is greater than the second interior diameter. Thus, the valve closure element can be arranged longitudinally movable in the first section and a shoulder can be provided as a valve seat between the sections. Thus, the valve housing can have simple contours which facilitates cost effective fabrication. Introducing longitudinal bore holes into the valve housing with different interior diameters is a standard fabrication method which can be implemented in a reliable and cost effective manner.

According to an advantageous embodiment the longitudinal bore hole, in particular in the portion with the larger interior diameter can have one or plural axially extending recesses, in particular in the first section with the larger interior diameter can have one or plural axially extending recesses which terminate at the valve seat. This way sufficient fluid flow can be provided through the check valve. In open condition of the check valve thus the hydraulic fluid can flow past the valve closure element, e.g. a ball with sufficient volume while a ball movement is supported by the first section of the longitudinal borehole and a stroke of the ball is limited by the separation prevention element. The recesses are producible in a simple and cost effective manner as well and can for example be milled.

According to an advantageous embodiment plural axially extending recesses can be arranged in pairs with reference to the valve longitudinal axis. This was the hydraulic fluid can flow in a flow profile that is symmetrical to the longitudinal valve axis. This furthermore provides safe support of the valve closure element, e.g. a ball with respect to a movement direction of the ball and a risk of the ball binding in the longitudinal bore hole is significantly reduced.

According to an advantageous embodiment the valve housing can provided with an exterior thread on its outside. The exterior thread facilitates threading the valve housing into the connecting rod body or the connection rod cover and can thus be safely mounted. This also facilitates reliable sealing of the check valve relative to the connecting rod body, e.g. by an additional seal.

Alternatively it is also possible to press the valve housing into the connecting rod body. Thus, leakage of hydraulic fluid at the check valve can be reliably prevented. Furthermore impressing the hydraulic valve is a very cost effective method of mounting the check valve in the connecting rod.

According to another aspect of the invention a connecting rod is proposed for a variable compression internal combustion engine, wherein the connecting rod includes at least one hydraulic chamber, wherein the hydraulic chamber is connectable by one of the check valves described supra with a supply connection or a bearing shell or a tank of the connecting rod.

Using a pin shaped separation prevention element facilitates a particularly cost effective configuration of the check valve and furthermore has the advantage that a flow through of the hydraulic fluid is restricted as little as possible when the valve is open so that a flow through resistance of the valve can be reduced. Thus, a significant advantage can be achieved over the typical safety of valve closure elements, e.g. balls which are typically secured by closure lids. The function of the closure lid can be performed by the standard component which reduces module cost.

Furthermore using a standard component as a separation prevention element and alternatively additionally also as a valve closure element of the check valve facilitates a particularly cost effective configuration of the check valve and thus also of the connecting rod. The standard component is available economically from various vendors and furthermore produced in large numbers which drives down production cost. Also attaching and mounting the standard component is quite advantageous since tools for machining the valve housing like e.g. fabricating the bore holes for standard components and mounting the standard components can be purchased economically. Thus, the entire check valve can be produced economically. Furthermore the quality of standard components can be monitored easily and maintained reliably. Thus, cost of the entire module can be advantageously reduced.

Assembly complexity of the check valve can be reduced by using standard components as a separation prevention element and additionally also as a valve closure element since the individual components of the check valves are configured simpler. Furthermore simplified contours at the valve housing provide a cost reduction over a conventional contour of a valve housing of a check valve.

According to an advantageous embodiment the check valve can be threaded or pressed into a connecting rod body or a connecting rod cover. The valve housing can include an external thread for threading on its outside. The external thread facilitates threading the valve housing into the connecting rod body or connecting rod cover and can thus mounting the valve housing securely. The check valve can also be reliably sealed relative to the connecting rod body e.g. by an additional seal. Alternatively it is also possible to press the valve housing into the connecting rod body. Thus, a possible leakage of the hydraulic fluid of the check valve can be reliably prevented. Furthermore impressing is a cost effective method of mounting the check valve into the connecting rod.

BRIEF DESCRIPTION OF THE DRAWINGS

Further advantages can be derived from the subsequent drawing description. The drawings schematically illustrate the embodiment of the invention. The drawings, the description and the claims include numerous features in combination. The person skilled in the art will advantageously view the features individually and combine them into additional useful combinations, wherein:

DETAILED DESCRIPTION OF THE INVENTION

Figure 1:
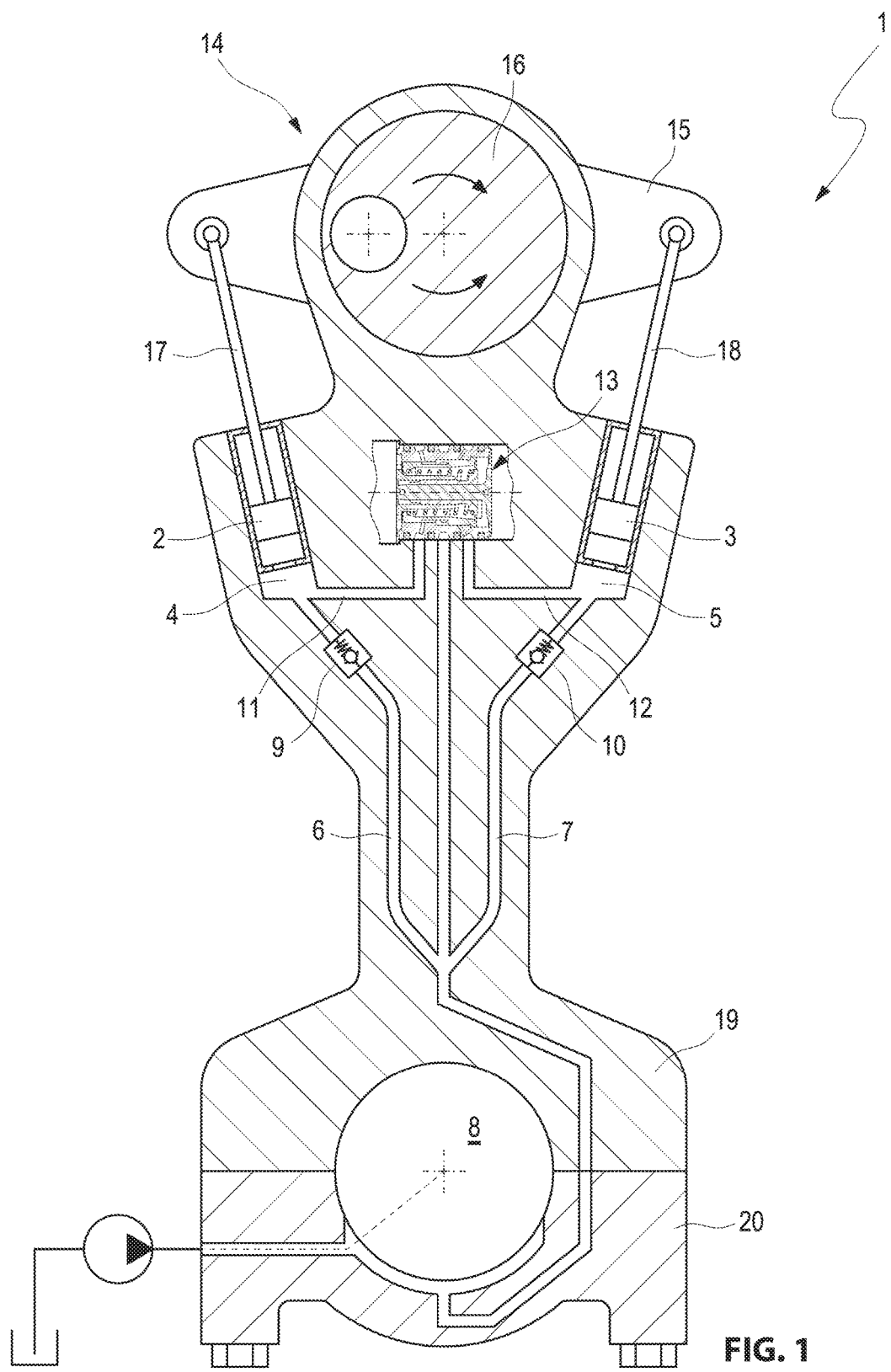
FIG. 1 illustrates a connecting rod according to an advantageous embodiment of the invention.

In the drawing figures identical or like components are designated with identical reference numerals. The figures only illustrate exemplary embodiments and do not limit the scope and spirit of the invention.

FIG. 1 illustrates a schematic view of a connecting rod 1 according to the invention for a variable compression internal combustion engine including an eccentrical element adjustment arrangement for adjusting an effective connecting rod length. The eccentrical element adjustment arrangement 14 includes an eccentrical element 16 that cooperates with a one piece or multi piece eccentrical element lever 15. Thus, an adjustment path of the eccentrical element adjustment arrangement 14 is adjustable by a switch valve 13.

Rotating the adjustable eccentrical element adjustment arrangement 14 is initiated by an impact of mass forces and load forces of the internal combustion engine which impact the eccentrical element adjustment arrangement during an operating stroke of the internal combustion engine. During the operating stroke effective directions of forces impacting the eccentrical element adjustment arrangement 14 change continuously. The rotating movement or adjustment movement is supported by one or plural pistons 2, 3 that are loaded with hydraulic fluid, in particular motor oil and integrated in the connecting rod 1, or the pistons 2, 3 prevent a reset of the eccentrical element adjustment arrangement 14 based on varying force effective directions of forces impacting the eccentrical element adjustment arrangement 14.

The pistons 2, 3 are operatively connected by eccentrical element rods 17, 18 with the eccentrical element lever 15. The pistons 2, 3 are displaceably arranged in hydraulic chambers 4, 5 and loaded through hydraulic fluid conduits 6, 7 from the crank bearing eye 8 with hydraulic fluid through the check valves 9, 10 which are subsequently described in more detail. The check valves 9, 10 that are only schematically illustrated in FIG. 1 prevent a flow back of the hydraulic fluid from the hydraulic chambers 4, 5 into the hydraulic fluid conduits 6, 7 into a bearing shell of the crank bearing eye 8 or a tank and facilitate pulling hydraulic fluid into the hydraulic chambers 4, 5. The hydraulic chambers 4, 5 are connected with additional hydraulic fluid conduits 11, 12 which cooperate with the check valve 13. The connecting rod 1 is only illustrated and described in an exemplary manner. Other embodiments of the connecting rod 1 or its components are conceivable within the spirit and scope of the invention. Thus, the check valve 13 can be configured as a hydraulic valve as illustrated or alternatively as a mechanically actuatable valve. By the same token the illustrated arrangement of the switch valve 13 in the connecting rod body 19 and the illustrated hydraulic connection between the switch valve 13 and the hydraulic chambers 4, 5 is not mandatory. Arranging the valve in the portion of the crank bearing eye 8 or in a connecting rod cover 20 is also conceivable.

FIGS. 2 through 5 illustrate the first check valve 9 in a partial sectional view, wherein the second check valve 10 is configured identical so that only the check valve 9 is subsequently described.

Figure 2:
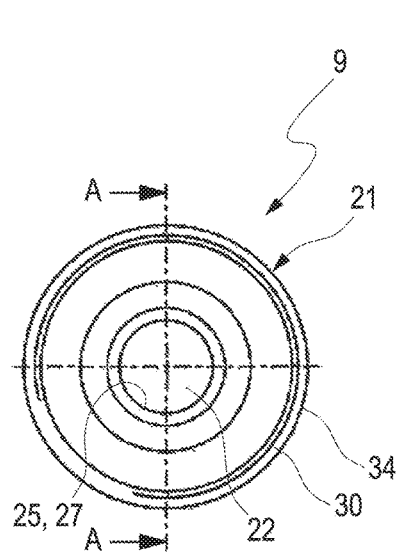
FIG. 2 illustrates a top view of the check valve according to the invention with a designated sectional plane A-A.
Figure 3:
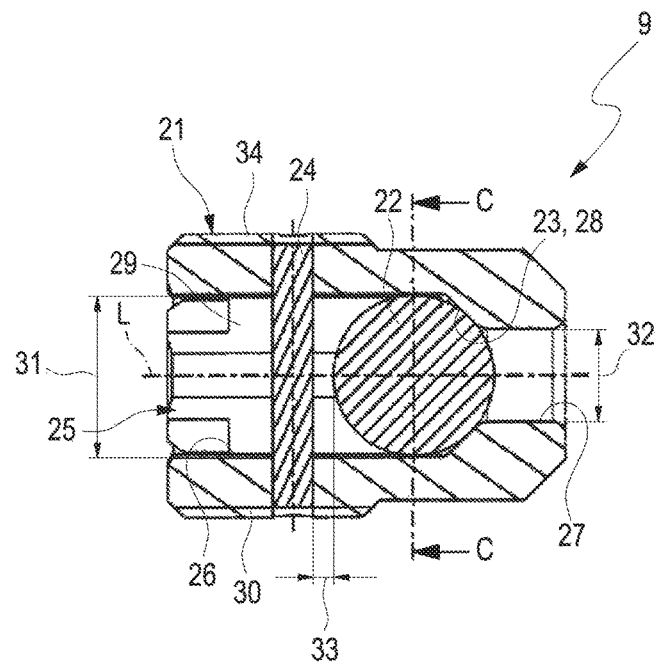
FIG. 3 illustrates the check valve according to FIG. 2 in a longitudinal sectional view A-A with an illustrated sectional plane C-C.
Figure 4:
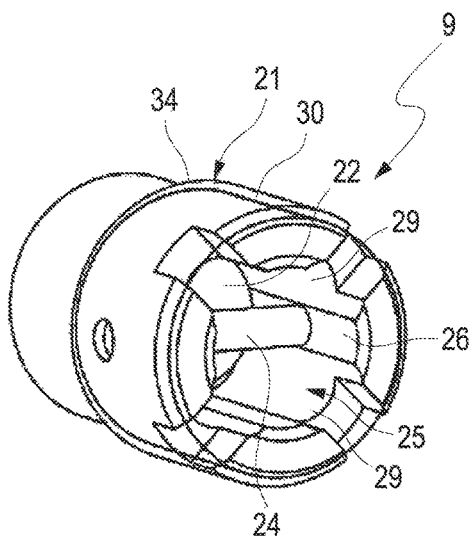
FIG. 4 illustrates a perspective view of the check valve according to FIG. 2.
Figure 5:
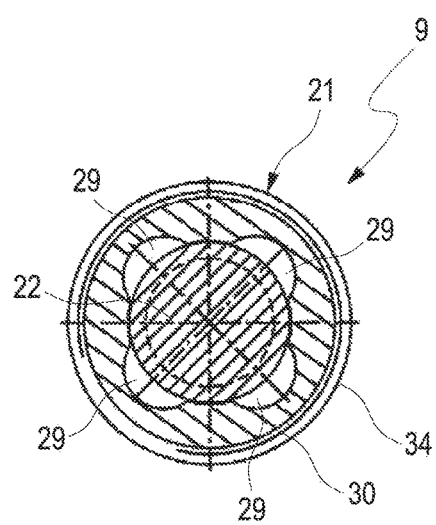
FIG. 5 illustrates the check valve according to FIG. 2 in a cross section C-C.

FIG. 2 illustrates a top view of the check valve 9 according to the invention with a designated sectional plane A-A. FIG. 3 illustrates the check valve 9 in the longitudinal sectional view A-A with the sectional plane C-C designated.

The check valve 9 includes a pot shaped valve housing 21 and a valve closure element 22 that is axially movable along a longitudinal valve axis L, wherein the valve closure element is applicable to a valve seat 23 and arranged in the valve housing 21. In order to provide separation prevention for the valve closure element 22 a pin shaped separation prevention element 24 is provided which secures the valve closure element 22 in the valve housing 21 which additionally defines a stroke 33 of the valve closure element 22 as evident from FIG. 3. The pin shaped separation prevention element 24 can be advantageously provided as a standard component.

As evident from FIG. 3 the separation prevention element 24 provided is pin shape and arranged transversal to the movement direction of the valve closure element 22. The pin can be advantageously configured as a standard cylindrical pin and can be produced according to the standard DIN EN ISO 8734 (March 1998). The separation prevention element 24 thus penetrates the valve housing 21 orthogonal to or substantially orthogonal to the longitudinal valve axis 12. The cylindrical pin 24 can be arranged in a form locking manner in the valve housing 21 in a radial borehole extending through the valve housing 21, the cylindrical pin can e.g. be pressed into the valve housing 21. Alternatively it is also possible to bond the cylindrical pin by gluing or welding, wherein these processes can also be used as safety in addition to a form locking pressing process.

Using a standard component as a separation prevention element 24 facilitates a particularly cost effective production of the check valve 9. The pin shaped separation prevention element 24 thus advantageously secures the valve closure element 22 in the valve housing 21, simultaneously facilitates a liquid flow through the valve body 21 which renders additional liquid pass through openings in the separation prevention element 24 unnecessary. Advantageously the separation prevention element 24 is provided as a cylindrical pin, however, it can have any shape which safely performs the recited functions. The cylindrical pin, however, is a particularly cost effective component and can furthermore be introduced into the valve housing 21 in a simple manner and can be attached in a form locking manner therein.

The valve closure element 22 is provided as a ball and thus also is an economical component. The ball is arranged longitudinally moveable in a first section 26 of a longitudinal borehole 25 with shoulders of the valve housing 21. The longitudinal bore hole 25 with shoulders includes a first section 26 with a first inner diameter 31 and a second section 27 with a second inner diameter 32, wherein the first inner diameter 31 is greater than the second inner diameter 32. A shoulder 28 that is arranged at a slant angle relative to the longitudinal axis L between the two sections 26, 27 functions as a valve seat 23 for the ball. The greater inner diameter 31 of the first section 26 corresponds to the diameter of the ball that is used as the valve closure element 22 with a required clearance so that the ball can move easily along the first section 26 of the longitudinal borehole 25.

When using a ball as a valve closure element the valve seat 23 can be advantageously configured with spherical sections at least in portions. This advantageously facilitates secure sealing of the valve seat by the pressed on ball. Furthermore reduced wear of valve seat and/or ball can be achieved due to the adapted contact surface between the ball and the valve seat.

This configuration of the contours makes the valve housing 21 much simpler so that a cost effective production is possible.

In order to provide a sufficient fluid flow through the check valve 9 the longitudinal borehole 25 includes plural axially extending recesses 29 in the first section 26, wherein the recesses terminate at the valve seat 23. The recesses 29 are arranged in pairs opposite to one another with respect to the longitudinal valve axis L. Also these recesses 29 are producible in a simple and cost effective manner. The recesses 29 which are clearly visible in particular in FIG. 5 in the cross-section C-C are configured almost semicircular and can be introduced into the valve housing 21 in a simple manner by a boring method. Alternatively, however, the recesses can also be milled. Other shapes of the recesses 29, however, are conceivable within the scope of the invention depending on the production method.

The check valve 9 can be pressed or threaded into the connecting rod body 19 or connection rod cover 20. When the check valve is threaded in it includes an exterior thread 30 at its outside 34 as apparent in the illustrated embodiment in particular in FIGS. 3 and 4, wherein the exterior thread extends over a portion of a length of the valve housing 21.

What is claimed is:

1. A check valve for a connecting rod for a variable compression internal combustion engine with at least one hydraulic chamber arranged in the connecting rod and connectable with a supply connection or a tank through the check valve, the check valve comprising:

a valve housing; and
a valve closure element that is axially movable in the valve housing along a longitudinal valve axis,
wherein the valve closure element is applicable to a valve seat and arranged in the valve housing secured against separation from the valve housing,
wherein a pin shaped separation prevention element is provided which secures the valve closure element in the valve housing and limits a stroke of the valve closure element,
wherein the valve housing includes a longitudinal borehole with shoulders that includes a first section with a first inner diameter and a second section with a second inner diameter,
wherein the first inner diameter is greater than the second inner diameter,
wherein the valve closure element is arranged longitudinally movable in the first section,
wherein a shoulder is provided between the first section and the second section,
wherein the shoulder forms a valve seat, and
wherein the first section of the longitudinal borehole includes one or plural axially extending recesses which terminate at the valve seat.

2. The check valve according to claim 1, wherein the separation prevention element is arranged transversal to a movement direction of the valve closure element.

3. The check valve according to claim 1, wherein the separation prevention element is arranged so that it penetrates the valve housing orthogonal or substantially orthogonal to the longitudinal valve axis.

4. The check valve according to claim 1, wherein the separation prevention element is configured as a standard cylindrical pin.

5. The check valve according to claim 1, wherein the separation prevention element is arranged in a form locking manner in the valve housing.

6. The check valve according to claim 1, wherein the separation prevention element is bonded in the valve housing.

7. The check valve according to claim 1, wherein the valve closure element is configured as a ball.

8. The check valve according claim 7, wherein the valve seat is configured spherical at least in sections.

9. The check valve according to claim 1, wherein plural axially axial extending recesses are arranged in pairs opposite to one another with respect to the longitudinal valve axis.

10. The check valve according to claim 1, wherein the valve housing includes an exterior thread on an outside of the valve housing.

11. A connecting rod for a variable compression internal combustion engine, the connecting rod comprising:
the check valve according to claim 1.

12. The connecting rod according to claim 11, wherein the check valve is threaded or pressed into a connecting rod body or a connecting rod cover.

* * * * *